W. A. BILTONEN.
SOLDERING IRON.
APPLICATION FILED MAR. 30, 1915.
1,233,963.
Patented July 17, 1917.
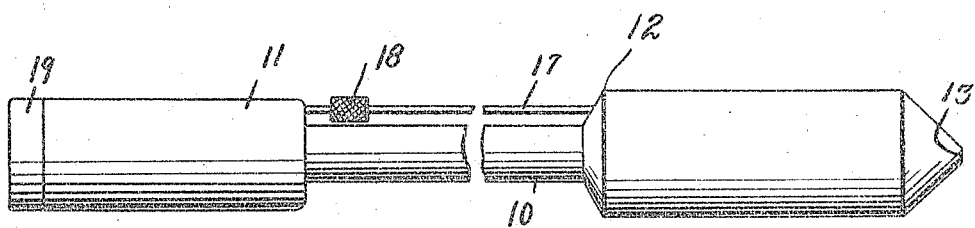
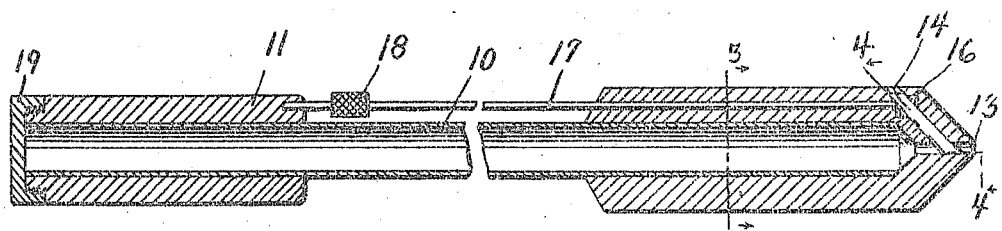
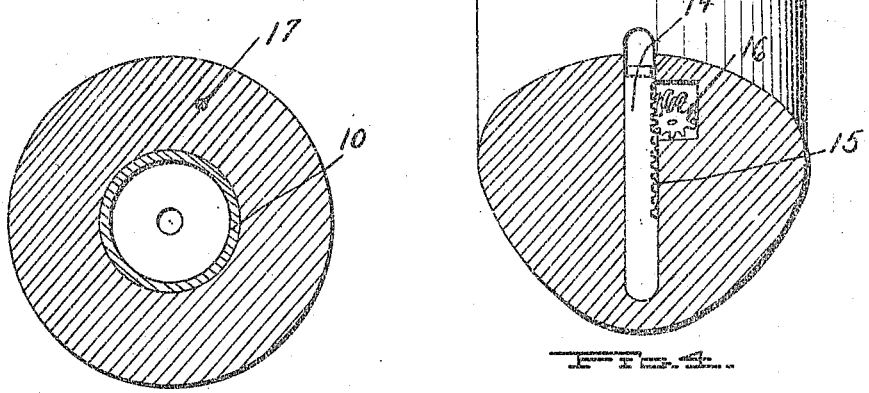
Witnesses
Arthur K. Moore
Harry M. Peck
Inventor
W. A. Biltonen
By Chandler & Chandler
Attorneys

UNITED STATES PATENT OFFICE.

WILLIAM A. BILTONEN, OF HOUGHTON, MICHIGAN.

SOLDERING-IRON.

1,233,963.

Specification of Letters Patent.    Patented July 17, 1917.

Application filed March 30, 1915.   Serial No. 18,132.

*To all whom it may concern:*

Be it known that I, WILLIAM A. BILTONEN, a citizen of the United States, residing at Houghton, in the county of Houghton, State of Michigan, have invented certain new and useful Improvements in Soldering-Irons; and I do hereby declare the following to be a full, clear, and exact description of the invention, such as will enable others skilled in the art to which it appertains to make and use the same.

This invention relates to improvements in soldering irons.

One object of the invention is to provide a simple and novel soldering iron which contains the solder within it, the same being adapted to be fed through the point of the head of copper.

Another object is to provide a simple and novel means for regulating the flow of the melted solder from the copper point.

Other objects and advantages will be apparent from the following description when taken in connection with the accompanying drawing.

In the drawing:

Figure 1 is an elevation of a soldering iron made in accordance with my invention, Fig. 2 is a vertical longitudinal sectional view therethrough, Fig. 3 is a transverse section on the line 3—3 of Fig. 2, and Fig. 4 is a section on the line 4—4 of Fig. 2.

Referring particularly to the accompanying drawing, 10 represents a tube of suitable length to one end of which is secured a handle 11 formed of wood or other non-conductor of heat. At the other end of the tube 10 is mounted the copper point 12, said tube running into a point as clearly shown. In the outer extremity of the head or point is formed a small discharge opening 13 the same being controlled by a sliding valve 14 disposed in the end of the head, diagonally with respect to said discharge opening, said valve being slidable across the opening as shown.

In one edge of the valve there is formed a series of teeth 15 these teeth being engaged by a pinion 16 carried on the forward end of a rod or shaft 17 extending rearwardly and having its other end rotatably mounted in the handle 11, the axis of rotation of said pinion extending diagonally with respect to said valve. A thumb-piece 18 is rigidly mounted on the shaft or rod by means of which the same can be turned to cause the pinion 16 to raise and lower the valve 14.

From the foregoing it will readily be seen that I have provided a simple and novel device of this character and one which can be easily and conveniently carried. The solder can be heated in any desired manner.

The outer end of the handle is provided with a removable cap 19 which closes the adjacent end of the tubular shank 10 and through which solder is introduced into the shank.

What is claimed is:

A soldering iron comprising a hollow shank, a handle at one end, a head at the opposite end having a tapered outer end provided with a solder outlet opening and a second opening extending diagonally to the first named opening, a valve plate slidable longitudinally in said second opening and crossing said outlet opening and provided with teeth on one edge, a longitudinally extending rotatable shaft having a pinion on one end engaging the teeth of said valve and its other end journaled in said handle, the axis of rotation of said pinion extending diagonally with respect to the longitudinal axis of said valve plate, and means carried by said shaft for rotating the same.

In testimony whereof, I affix my signature, in the presence of two witnesses.

WILLIAM A. BILTONEN.

Witnesses:
JOHN KIISKILA,
JOHN B. WIRKKER.

Copies of this patent may be obtained for five cents each, by addressing the "Commissioner of Patents. Washington, D. C."